United States Patent
Lam et al.

(10) Patent No.: US 7,447,621 B1
(45) Date of Patent: Nov. 4, 2008

(54) PLI-LESS CO-SIMULATION OF ISS-BASED VERIFICATION SYSTEMS IN HARDWARE SIMULATORS

(75) Inventors: William K. Lam, Newark, CA (US); Mohamed Soufi, Santa Clara, CA (US); Victor A. Chang, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1149 days.

(21) Appl. No.: 10/674,223

(22) Filed: Sep. 29, 2003

(51) Int. Cl.
*G06F 9/45* (2006.01)
(52) U.S. Cl. ..................................................... 703/22
(58) Field of Classification Search .................... 703/22
See application file for complete search history.

(56) References Cited

U.S. PATENT DOCUMENTS

| | | | | |
|---|---|---|---|---|
| 5,438,673 A | * | 8/1995 | Court et al. | 703/22 |
| 5,845,064 A | * | 12/1998 | Huggins | 714/33 |
| 5,859,962 A | * | 1/1999 | Tipon et al. | 714/33 |
| 5,991,529 A | * | 11/1999 | Cox et al. | 703/9 |
| 6,285,914 B1 | * | 9/2001 | Bae et al. | 700/121 |
| 6,332,201 B1 | * | 12/2001 | Chin et al. | 714/28 |
| 6,625,759 B1 | * | 9/2003 | Petsinger et al. | 714/28 |
| 7,139,936 B2 | * | 11/2006 | Petsinger et al. | 714/28 |
| 2004/0167766 A1 | * | 8/2004 | Ishtiaq et al. | 703/22 |

OTHER PUBLICATIONS

Josseo Yim et al., "Design Verification of Complex Microprocessors", 1996, Proceedings of IEEE Asia Pacific Conference on Circuits and Systems, pp. 441-448.*

Charles N. Fischer et al., "Crafting a compiler with C", 1991, Benjamin/Cummings Publishing Company, pp. 622-636.*

Synopsys, "Smart Verification with VCS 7.0", Apr. 2003, retrieved from www.synopsys.com/products/simulation/smart_verif_wp.html, pp. 1-5.*

Samir Palnitkar, "Verilog HDL", 1996, SunSoft Press, pp. 157-167, 229-237, 249-251.*

Nathan Dohm et al., "Zen and the Art of Alpha Verification", 1998, Proceedings of International Conference on Computer Design: VLSI in Computers and Processors, seven unnumbered pages.*

Marines Puig-Medina et al., "Verification of Configurable Processor Cores", 2000, Proceedings of the 2000 Design Automation Conference, pp. 426-431.*

Darren Brown et al., "Functional Verification of a Multiple-Issue, Out-of-Order, Superscalar Alpha Processor- The DEC Alpha 21264 Microprocessor", 1998, Proceedings of the Design Automation Conference 1998, pp. 638-643.*

Charles Dawson et al., "The Verilog Procedural Interface for the Verilog Hardware Description Language", 1996, Proceedings of the 1996 IEEE International Verilog HDL Conference, pp. 17-23.*

* cited by examiner

*Primary Examiner*—Paul L Rodriguez
*Assistant Examiner*—Russ Guill
(74) *Attorney, Agent, or Firm*—Osha • Liang LLP (57) ABSTRACT

A method for providing verification for a simulation design, including obtaining the simulation design comprising a programming language interface system call, encoding a target of the programming language interface system call into the simulation design to obtain a first modified simulation design, modifying the programming language interface system call to reference the target in the first modified simulation design to obtain a second modified simulation design, and verifying the second modified simulation design using a simulation testbench.

14 Claims, 6 Drawing Sheets

PLI-LESS CO-SIMULATION OF ISS-BASED VERIFICATION SYSTEMS IN HARDWARE SIMULATORS

BACKGROUND OF INVENTION

Modern high performance microprocessors have an ever-increasing number of circuit elements and an ever-rising clock frequency. Also, as the number of circuits that can be used in a CPU has increased, the number of parallel operations performed by the circuits has risen. Examples of efforts to create more parallel operations include increased pipeline depth and an increase in the number of functional units in super-scalar and very-long-instruction-word architectures. As CPU performance continues to increase, the result has been a larger number of circuits switching at faster rates. Thus, from a circuit design perspective, important considerations such as the time needed to complete a circuit simulation and the time needed to debug the CPU are taken into account.

As each new CPU design uses more circuits and circuit elements, each often operating at increased frequencies, the time required to simulate the circuit design increases. Due to the increased time for simulation, the number of tests, and consequently the test coverage, may decrease. In general, the result has been a dramatic increase in the logic errors that escape detection before the CPU is manufactured.

Circuit simulation may occur at a "switch-level." Switch-level simulations typically include active circuit elements (e.g., transistors) and passive circuit elements (e.g., resistors, capacitors, and inductors). Circuit simulation also may occur at a "behavioral level." Behavioral level simulations typically use a hardware description language (HDL) that determines the functionality of a single circuit element or group of circuit elements.

A typical behavioral level simulation language is "Verilog," which is an Institute of Electrical and Electronics Engineers standard. Verilog HDL uses a high-level programming language to describe the relationship between the input and output of one or more circuit elements. Verilog HDL describes on what conditions the outputs should be modified and what affect the inputs have. Verilog HDL programs may also be used for logic simulation at the "register transfer level" (RTL). RTL is a programming language used to describe a circuit design. The RTL programs written in Verilog go through a verification process. During this process, the Verilog design is parsed and checked for RTL style conformance by a style checker.

Using the Verilog HDL, for example, digital systems are described as a set of modules. Each module has a port interface, which defines the inputs and outputs for the module. The interface describes how the given module connects to other modules. Modules can represent elements of hardware ranging from simple gates to complete systems. Each module can be described as an interconnection of sub-modules, as a list of terminal elements, or a mixture of both. Terminal elements within a module can be described behaviorally, using traditional procedural programming language constructs such as "if" statements and assignments, and/or structurally as Verilog primitives. Verilog primitives include, for example, truth tables, Boolean gates, logic equation, pass transistors (switches), etc.

HDL simulations, written using HDL languages, may be event-driven or cycle-based. Event-driven simulators are designed to eliminate unnecessary gate simulations without introducing an unacceptable amount of additional testing. Event-driven simulators propagate a change in state from one set of circuit elements to another. Event-driven simulators may record relative timing information of the change in state so that timing and functional correctness may be verified. Event-driven simulators use event queues to order and schedule the events. Event-driven simulators process and settle all the active events in a time step before the simulator can move to the next time step.

Cycle-based simulators also simulate a change in state from one set of circuit elements to another; however, the state of an entire system is evaluated once each clock cycle. Cycle-based simulators are applicable to synchronous digital systems and may be used to verify the functional correctness of a digital design. Cycle-based simulators abstract away the timing details for all transactions that do not occur on a cycle boundary. Cycle-based simulators use algorithms that eliminate unnecessary calculations to achieve improved performance in verifying system functionality. Discrete component evaluations and re-evaluations are typically unnecessary upon the occurrence of every event.

Cycle-based simulators typically have enhanced performance. Depending on the particular options used, cycle-based simulators can offer five to ten times improvement in speed and one-fifth to one-third the memory utilization over conventional, event-driven simulators. Some cycle-based simulators also offer very fast compile times. For very large designs, the reduced memory requirements of cycle-based simulators allow a design team to simulate a design on almost every workstation on their network.

Figure 1:
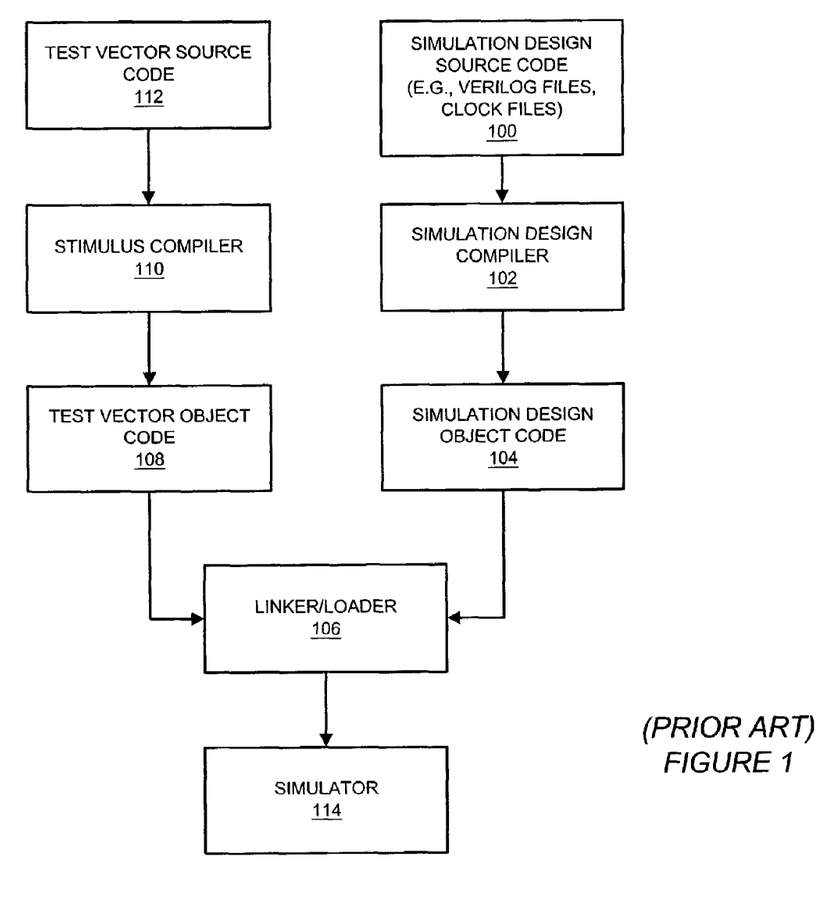
FIG. 1 illustrates a flow diagram of a typical simulation system.

A typical simulation system (e.g., cycle-based simulator) is shown in FIG. 1. A simulation design source code (100), which includes, for example, Verilog files, clock files, etc., is an input into a simulation design compiler (102). The simulation design compiler (102) statically generates simulation design object code (104). A linker/loader (106) takes as input the simulation design object code (104) and a test vector object code (108), which is output from a stimulus compiler (110). Test vector source code (112) is input into the stimulus compiler (110).

The test vector object code (108) provides stimulus in the form of input signal values for the simulation, which is run on the simulator (114). For example, if a particular module included in the simulation design object code (104) includes an AND gate, the test vector object code (108) may provide stimulus in the form of a signal value equal to "1" to be sent to a pin of the AND gate at a particular time. The test vector object code (108) may also include expected outputs for signal values stimuli.

The test vector object code (108) may include multiple test vectors. For example, a collective test vector may include a first test vector to test a first group of modules of the simulation design object code (104), and a second test vector to test a second group of modules of the simulation design object code (104).

Using the test vector (108) and the simulation design object code (104), the linker/loader (106) generates and loads an executable code (i.e., an executable program or simulation image) into the memory of simulator (114), where the simulation is performed. Depending on implementation, the simulator may use typical, "standard" computer architectures, such as may be found in a workstation, or may use other, "non-standard" computer architectures, such as computer architectures developed specifically for simulation or specifically for verification of circuit design, e.g., a massively parallel processing machine.

SUMMARY OF INVENTION

In general, in one aspect, the invention relates to a method for providing verification for a simulation design, comprising obtaining the simulation design comprising a programming language interface system call, encoding a target of the programming language interface system call into the simulation design to obtain a first modified simulation design, modifying the programming language interface system call to reference the target in the first modified simulation design to obtain a second modified simulation design, and verifying the second modified simulation design using a simulation testbench.

In general, in one aspect, the invention relates to a computer system for providing verification for a simulation design, comprising a processor, a memory, a storage device, and software instructions stored in the memory for enabling the computer system to perform obtaining the simulation design comprising a programming language interface system call, encoding a target of the programming language interface system call into the simulation design to obtain a first modified simulation design, modifying the programming language interface system call to reference the target in the first modified simulation design to obtain a second modified simulation design, and verifying the second modified simulation design using a test vector.

In general, in one aspect, the invention relates to a system for verifying a simulation design, comprising a simulation design comprising a component, an encoded target of a programming language interface system call, and a reference to the encoded target, a test vector providing an input signal value for the component in the simulation design, and a simulation testbench providing functionality to verify the simulation design using the test vector.

In general, in one aspect, the invention relates to an apparatus providing verification for a simulation design, comprising means for obtaining the simulation design comprising a programming language interface system call, means for encoding a target of the programming language interface system call into the simulation design to obtain a first modified simulation design, means for modifying the programming language interface system call to reference the target in the first modified simulation design to obtain a second modified simulation design, and means for verifying the second modified simulation design using a test vector.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Manufacturers of highly complex circuit designs, such as Central Processing Units (CPU's), typically require verification of simulation design objects in order to verify that the circuits are designed properly. Typically, verification is used to compare a first version of the design to a second version of the design. Often the first version of the design corresponds to a high-level description of the design, such as an Instruction Set Simulator (ISS) model, and the second version corresponds to a lower level design, such as design implemented at the register level (e.g., an RTL design). Typically, one of the versions already has been verified, and serves as a specification, or reference, against which the other version is verified. In the above scenario, the high level design typically serves as the reference version.

Figure 2:
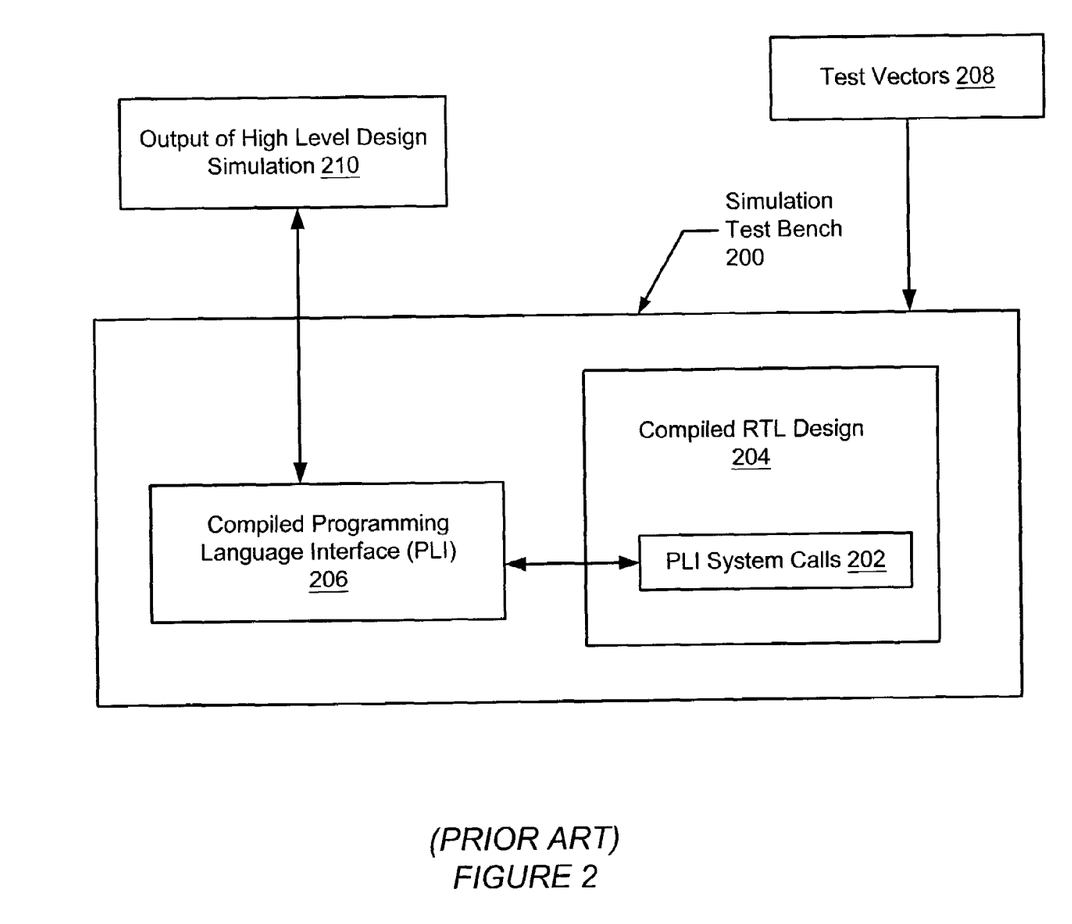
FIG. 2 illustrates a flow diagram of a typical interaction between an RTL design and a corresponding high-level design.

FIG. 2 illustrates a flow diagram of a typical interaction between an RTL design and a corresponding high-level design using a prior art verification method. Initially, a high-level design and a corresponding RTL design are created. In order to verify the RTL design Programming Language Interface (PLI) system calls (202) are embedded within the RTL design. The PLI system calls (202) are embedded throughout the RTL design and provide the RTL design with enhanced input/output (I/O) functionality. Specifically, during RTL design verification, PLI system calls (202) are used to obtain information about the correct value for a particular component, such as a flip-flop, from a reference source (i.e., the high-level design). Thus, the PLI system calls (202) provide an interface between a RTL design and an external resource.

Once an RTL design, including PLI system calls (202), has been coded, the RTL design is compiled to generate a compiled RTL design (204). In addition, the corresponding PLI, which includes the functions that are called via the PLI system calls (202) in the compiled RTL design, is also compiled to generate a compiled PLI (206). At this stage, the compiled RTL design (204) and the compiled PLI (206) are linked (i.e., the binary files corresponding to the compiled PLI (206) and the compiled RTL design (204) are linked).

The compiled RTL design (204) and the compiled PLI (206) are then loaded into a Simulation Test Bench (STB) (200) along with one or more test vectors (208). The compiled RTL design (204) is then executed, with the test vectors serving as input to the compiled RTL design (204). When PLI system calls (202) are encountered during execution of the compiled RTL design (204), the execution of the compiled RTL design (204) pauses while the particular PLI system call (202) invokes a corresponding function in the compiled PLI (206). For the purposes of RTL design verification, the compiled PLI (206) typically includes functions to retrieve a reference value against which the value of the corresponding RTL design component is compared. If the value of the corresponding RTL design component matches the reference value, then the STB (200) resumes execution of the compiled RTL design (204). Otherwise, the STB (200) typical outputs an error message, then resumes execution of the compiled RTL design (204).

The reference value is denoted as Output of High Level Design Simulation (210) in FIG. 2. Depending on implementation of the RTL design verification, the Output of High Level Design Simulation (210) may be generated prior to execution of the compiled RTL design (204) or generated concurrently on a cycle-by-cycle basis, as is typically seen in prior art ad hoc design verification methods.

Typically, if STB (200) is a hardware-based simulation system, the STB (200) is able to execute the compiled RTL design (204) in a very efficient manner. However, PLI system calls, which are essentially software function calls embedded in the compiled RTL design (204) tend to decrease the efficiency in which the compiled RTL design (204) is executed. Reducing the I/O processes required by the PLI system calls (202) typically has the effect of increasing efficiency of the complied RTL design (204).

Figure 3:
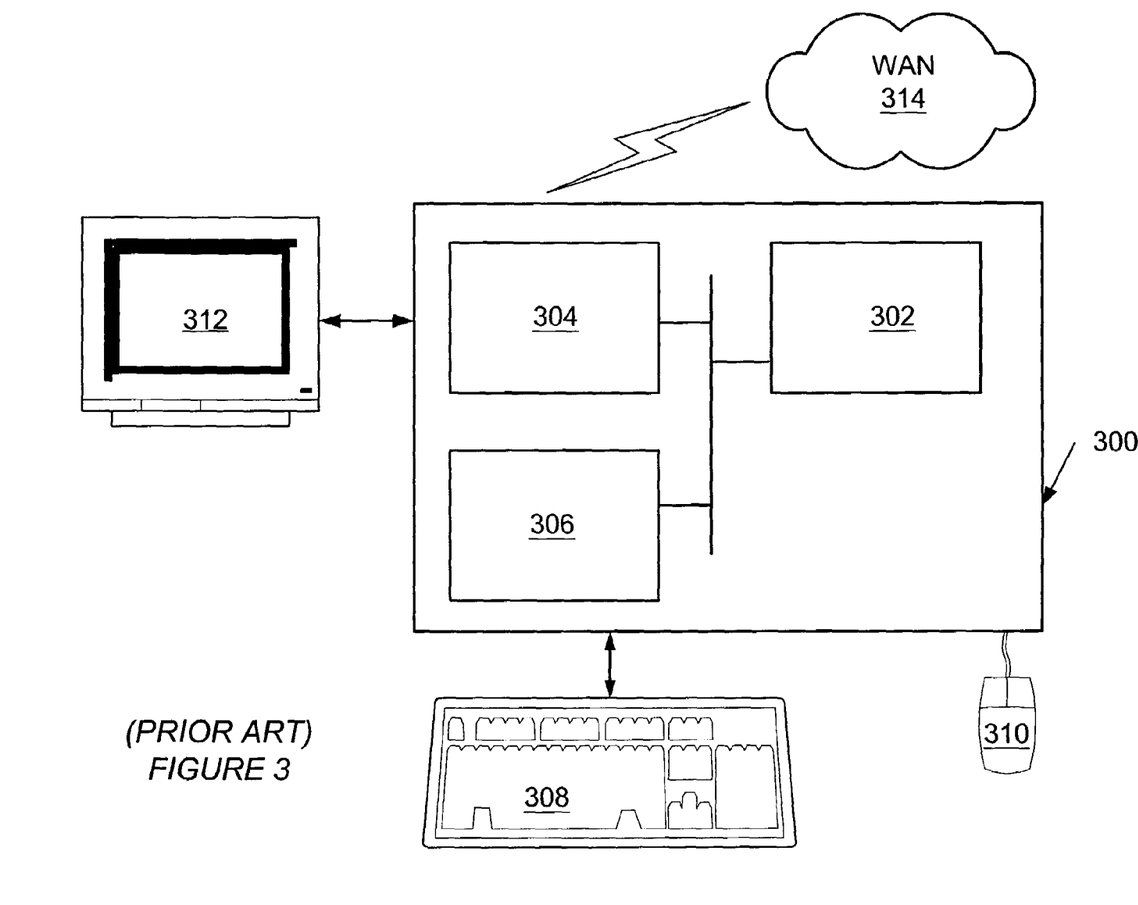
FIG. 3 illustrates a typical networked computer system.

The invention may be implemented on virtually any type computer regardless of the platform being used. For example, as shown in FIG. 3, a typical networked computer system (300) includes a processor (302), associated memory (304), a storage device (306), and numerous other elements and functionalities typical of today's computers (not shown). The networked computer (300) may also include input means, such as a keyboard (308) and a mouse (310), and output means, such as a monitor (312). The networked computer system (300) is connected to a wide area network (314) (e.g., the Internet) via a network interface connection (not shown). Those skilled in the art will appreciate that these input and output means may take other forms.

Figure 4:
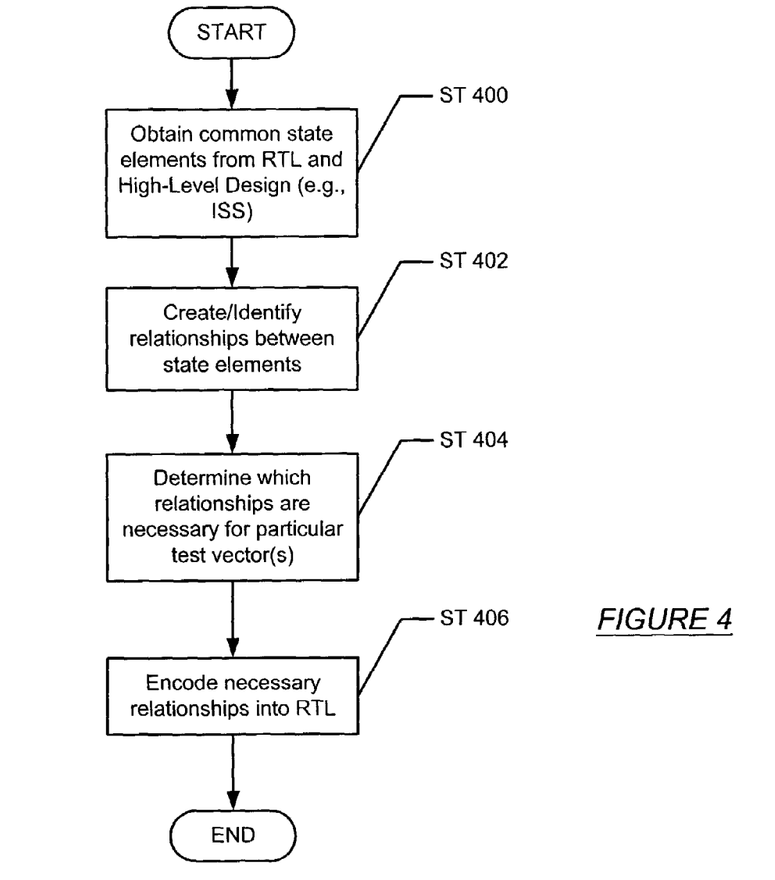
FIG. 4 illustrates a flow chart in accordance with one embodiment of the invention.

FIG. 4 illustrates a flow chart in accordance with one embodiment of the invention. Initially, state elements are obtained from the RTL design and high-level design (e.g., ISS) (Step 400). In one embodiment of the invention, state elements in the RTL design include, but are not limited to, variables corresponding to flip-flops, latches, memory, etc. Additionally, state elements in the high-level design may include, but are not limited to, processor registers and memories that have a corresponding hardware counterpart. Once the state elements have been obtained from both the high-level design and/or the RTL design, relationships are identified between the state elements of the corresponding designs (Step 402). In one embodiment of the invention, the relationships identify equivalent/corresponding state elements in the two designs. One method for identifying and creating relationships between the state elements in the corresponding designs is illustrated in FIG. 5.

Figure 5:
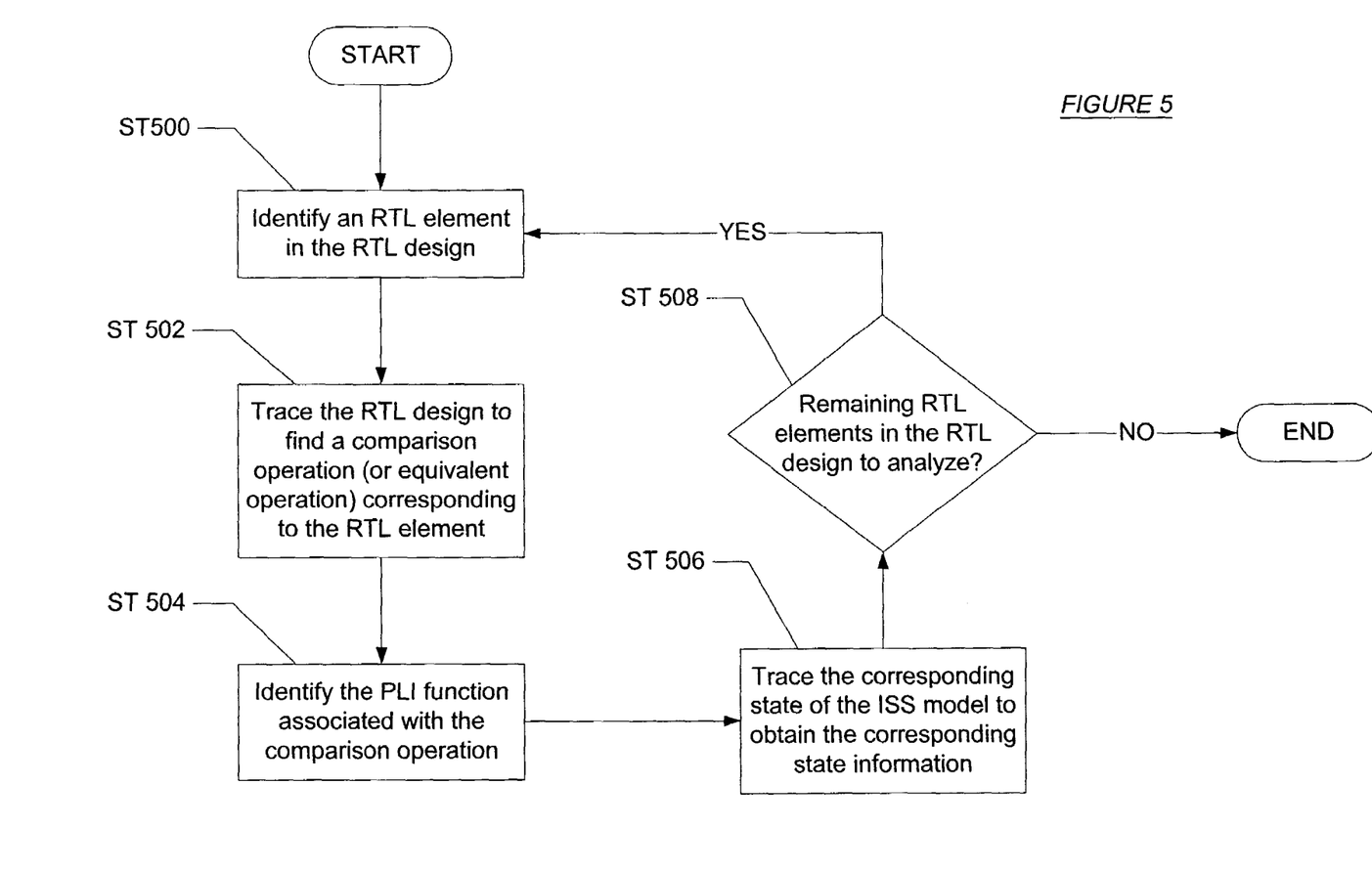
FIG. 5 illustrates a flow chart for determining relationships between state elements in accordance with one embodiment of the invention.

FIG. 5 illustrates a flow chart for determining relationships between state elements in accordance with one embodiment of the invention. Initially, a state element in the RTL design is identified (Step 500). In one embodiment of the invention, the state elements in the RTL are determined by identifying all the arguments in the PLI calls and then tracing through the RTL design to identify the state elements of the RTL that correspond to the arguments.

A trace of the RTL design is subsequently performed to find a comparison operation (or an equivalent operation) that is associated with individual state elements of the RTL identified in Step 500 (Step 502). The comparison operation refers to any operation that is used to verify the value of a particular RTL state element at a given cycle or series of cycles. Once the comparison operation (or equivalent) has been found, an associated PLI function in the ISS corresponding the PLI system call is identified. (Step 504). In one embodiment of the invention, the PLI system call associated with the comparison (or equivalent) operation is determined by parsing a PLI registration file. The PLI registration file typically contains a one-to-one mapping of function in the PLI to the comparison (or equivalent) operation.

Once the corresponding function of the PLI has been identified, the portion of the ISS in which the function of the PLI occurs is traced to obtain information necessary to encode the comparison information (Step 506). In addition, though not shown in FIG. 5, the relationship information obtained during Step 402 recorded (temporarily or permanently). Steps 500-506 are repeated until there are no more RTL state elements remaining to be analyzed (Step 508).

Those skilled in the art will appreciate that while the relationships have been determined by first analyzing the RTL design and then determining the corresponding elements in the ISS, the present invention may be implemented by first analyzing the ISS design and then determining the corresponding state elements in the RTL design.

Returning to FIG. 4, once the relationships between the state elements have been established, the relationships are screened to determine which relationships are relevant to the particular test vector that is being used to verify that the two designs are equivalent (Step 404). In one embodiment of the invention, the relevance/importance of a particular relationship with respect to a test vector is determined by monitoring the arguments of PLI systems calls when a particular test vector is being used and recording the activity of the arguments of the PLI system calls. This information is subsequently used to determine which arguments in the PLI system calls are relevant/important to the particular test vector. Once the relevant/important arguments from the PLI system calls are determined the relationships corresponding to relevant/important arguments from the PLI system calls are identified and the remaining relationships discarded.

In one embodiment of the invention, the results of Step 404 are saved in searchable form such that the results may be analyzed to generate models which allow a user to predict which relationships are important/relevant for a particular test vector without requiring the user to simulate a representative sample of the RTL code.

Once the relationships have been screened and the unnecessary relationships have been discarded, the remaining relationships are encoded in the RTL design, thereby eliminating or at least reducing the number of PLI system calls (Step 406). In one embodiment of the invention, the values of the high level design state elements corresponding to the remaining relationships are encoded in the PLI using arrays. Specifically, the values of each state element in the high-level design corresponding to the remaining relationships for each cycle are encoded into an array, where the cycle corresponds to an index into the array. Thus, there is one array for every state element in the high-level design corresponding to the remaining relationships. Alternatively, the aforementioned state element information may be encoded in a multi-dimensional array (ii), where i corresponds to the cycle, and j corresponds to the state element. Those skilled in the art will appreciate that the RTL code may require modification by replacing the PLI system calls with internal system calls to the appropriate array index (or indices, if the encoding is implemented using a multi-dimensional array).

Figure 6:
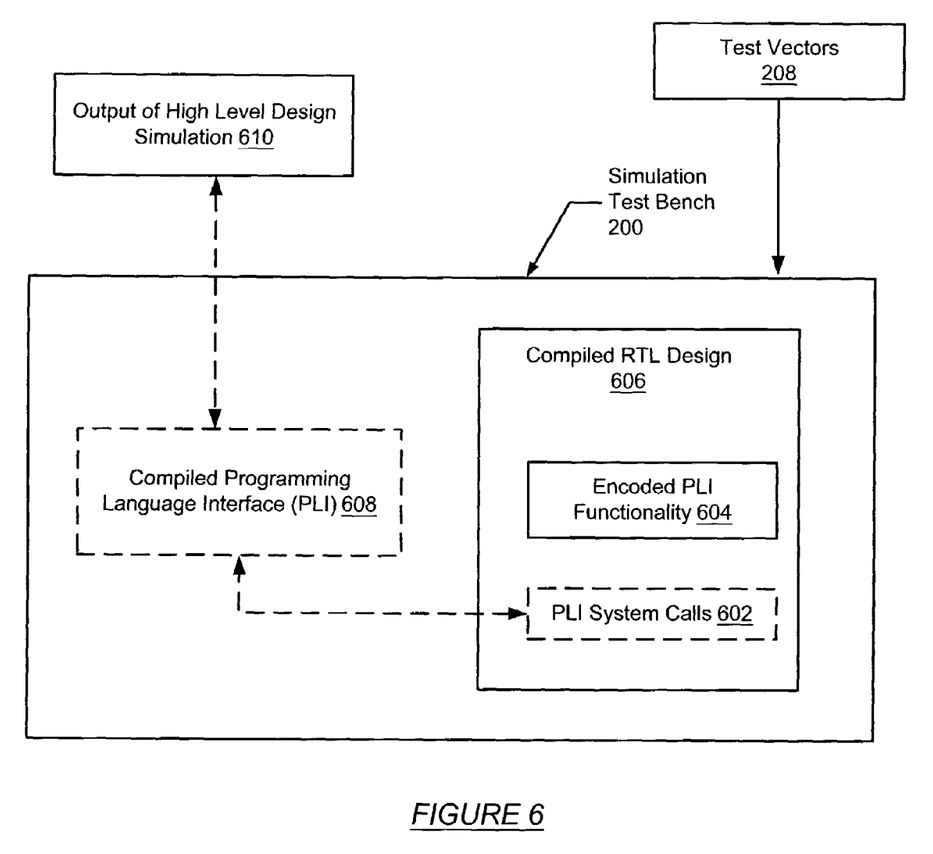
FIG. 6 illustrates a flow diagram of interaction between an RTL design and a corresponding high-level design in accordance with one embodiment of the invention.

FIG. 6 illustrates a flow diagram of interaction between an RTL design and a corresponding high-level design in accordance with one embodiment of the invention. Initially, a high-level design and a corresponding RTL design are created. The RTL design is subsequently modified to remove some or all of the PLI system calls (602) and add encoded PLI functionality (604) as described in FIGS. 4 and 5. The RTL design, including the encoded PLI functionality (604) and the PLI system calls (602), if any, are subsequently compiled to generate a compiled RTL design (606). In addition, PLI components that are required to support the PLI system calls (602) are also compiled to generate a compiled PLI (608).

At this stage, the compiled RTL design (606) and the compiled PLI (608), if present, are linked (i.e., the binary files corresponding to the compiled PLI (608) and the compiled RTL design (606) are linked).

The compiled RTL design (606) and the compiled PLI (608), if present, are then loaded into the STB (200) along with one or more test vectors (208). The compiled RTL design (204) is then executed, with the test vectors (208) serving as input to the compiled RTL design (606).

When an internal system call to encoded PLI functionality (604) is encountered during the execution of the compiled RTL (606), the internal system call retrieves the requested information from the encoded PLI functionality (604). In the context of RTL design verification, the request information typically corresponds to a request for encoded reference values, such as those described in FIG. 4. In addition, if a PLI system call (602) is encountered during execution of the compiled RTL design (606), the execution of the compiled RTL design (606) pauses while the PLI system call (602) invokes a function in the compiled PLI (608).

For the purposes of RTL design verification, the compiled PLI (608) typically includes functions to retrieve a reference value against which the value of the corresponding RTL design component is compared. If the value of the corresponding RTL design component matches the reference value then the STB (200) resumes execution of the compiled RTL design (606). However, if the value of the corresponding RTL design component does not match the reference value then the STB (200) typical outputs an alert (e.g., a message, a dump file, etc.) and then resumes execution of the compiled RTL design (606).

The reference value is denoted as Output of High Level Design Simulation (210). In accordance with one embodiment of the invention, the output of High Level Design Simulation (610) is generated prior to execution of the compiled RTL design (606).

Embodiments of the present invention may have one or more of the following advantages. Embodiments of the invention provide a more efficient method for verifying an RTL design on a hardware-based simulator. The number of I/O processes required during execution of a simulation is reduced resulting in increased performance. Further, embodiments of the invention provide a method for encoding a reference source into an RTL design to facilitate RTL design verification. In some embodiments, a more compact RTL design is provided for regression testing by not encoding relationships that are not active when particular test vectors are run.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for providing verification for a simulation design, comprising:
obtaining the simulation design comprising a programming language interface system call;
obtaining a reference value corresponding to the programming language interface system call;
encoding the reference value into the simulation design to obtain a modified simulation design, comprising:
obtaining a set of hardware state elements from the simulation design;
obtaining a set of high-level state elements from a high-level design;
determining a common set of state elements from the set of hardware state elements and the set of high-level state elements;
identifying at least one relationship between the high-level state element and the hardware state element in the common set of state elements;
determining whether the at least one relationship is influenced by a test vector to obtain an influenced set of relationships; and
encoding the influenced set of relationships to obtain the modified simulation design, comprising:
obtaining high-level state element values for the high-level state elements in the influenced set of relationships from a simulation of the high-level design, and
storing the high-level state element values in an array, wherein at least one of the high-level state element values is the reference value;
compiling the modified simulation design to obtain a compiled simulation design; and
verifying the compiled simulation design using a simulation test bench.

2. The method of claim 1, wherein the simulation design comprises a register transfer level design.

3. The method of claim 1, wherein the high-level state element comprises at least one from the group consisting of a processor register and a memory.

4. The method of claim 1, wherein the hardware state element comprises at least one from the group consisting of a flip-flop, a latch, and a memory.

5. The method of claim 1, wherein the relationship comprises at least one of the group consisting of a one-to-one relationship, a one-to-many relationship, and a relationship defined by a mathematical function.

6. The method of claim 1, wherein the compiled simulation design is verified on a hardware-based simulation test bench.

7. A computer system for providing verification for a simulation design, comprising:
a processor;
a memory;
a storage device; and
software instructions stored in the memory for enabling the computer system to perform:
obtaining the simulation design comprising a programming language interface system call;
obtaining a reference value corresponding to the programming language interface system call;
encoding the reference value into the simulation design to obtain a modified simulation design, comprising:
obtaining a set of hardware state elements from the simulation design;
obtaining a set of high-level state elements from a high-level design;
determining a common set of state elements from the set of hardware state elements and the set of high-level state elements;
identifying at least one relationship between the high-level state element and the hardware state element in the common set of state elements;

determining whether the at least one relationship is influenced by a test vector to obtain an influenced set of relationships; and encoding the influenced set of relationships to obtain the modified simulation design, comprising:

obtaining high-level state element values for the high-level state elements in the influenced set of relationships from a simulation of the high-level design, and storing the high-level state element values in an array, wherein at least one of the high-level state element values is the reference value;

compiling the modified simulation design to obtain a compiled simulation design; and verifying the compiled simulation design using a simulation test bench.

8. The computer system of claim 7, wherein the simulation design comprises a register transfer level design.

9. The computer system of claim 7, wherein the high level state element comprises at least one from the group consisting of a processor register and a memory.

10. The computer system of claim 7, wherein the hardware state element comprises at least one from the group consisting of a flip-flop, a latch, and a memory.

11. The computer system of claim 7, wherein the relationship comprises at least one of the group consisting of a one-to-one relationship, a one-to-many relationship and a relationship defined by a mathematical function.

12. The computer system of claim 7, wherein the modified simulation design is verified on a hardware-based simulation test bench.

13. Apparatus providing verification for a simulation design, comprising:

means for obtaining the simulation design comprising a programming language interface system call;

means for obtaining a reference value corresponding to the programming language interface system call;

means for encoding the reference value into the simulation design to obtain a modified simulation design, comprising:

means for obtaining a set of hardware state elements from the simulation design;

means for obtaining a set of high-level state elements from a high-level design;

means for determining a common set of state elements from the set of hardware state elements and the set of high-level state elements;

means for identifying at least one relationship between the high-level state element and the hardware state element in the common set of state elements;

means for determining whether the at least one relationship is influenced by a test vector to obtain an influenced set of relationships; and means for encoding the influenced set of relationships to obtain the modified simulation design, comprising:

obtaining high-level state element values for the high-level state elements in the influenced set of relationships from a simulation of the high-level design, and storing the high-level state element values in an array, wherein at least one of the high-level state element values is the reference value;

means for compiling the modified simulation design to obtain a compiled simulation design; and means for verifying the compiled simulation design using a simulation test bench.

14. The apparatus of claim 13, wherein the simulation design comprises a register transfer level design.

\* \* \* \* \*